Figure 1:
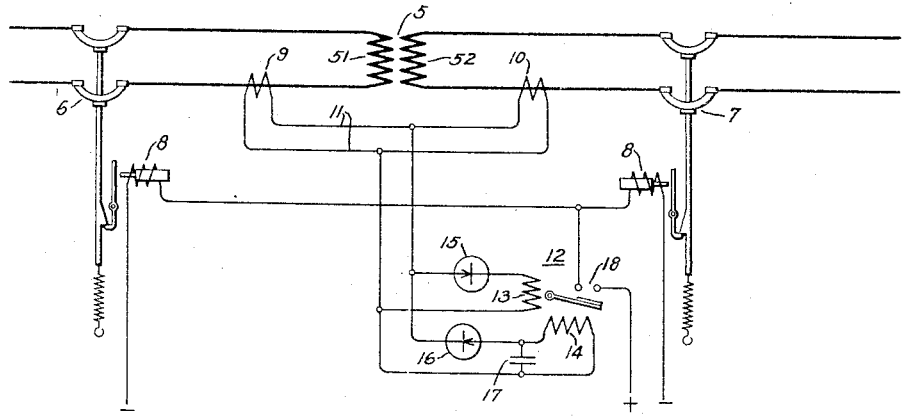

Feb. 21, 1933. J. G. WELLINGS ET AL 1,898,752

PROTECTIVE ARRANGEMENT

Filed Sept. 6, 1932

Inventors
John G. Wellings
Charles G. Mayo
Paul Mathews
by Charles V. Mullen
Their Attorney Patented Feb. 21, 1933

1,898,752

UNITED STATES PATENT OFFICE

JOHN G. WELLINGS, CHARLES G. MAYO, AND PAUL MATHEWS, OF RUGBY, ENGLAND, ASSIGNORS TO GENERAL ELECTRIC COMPANY, A CORPORATION OF NEW YORK

PROTECTIVE ARRANGEMENT

Application filed September 6, 1932, Serial No. 631,916, and in Great Britain September 2, 1931.

Our invention relates to improvements in protective arrangements and more particularly to improvements in protective arrangements for alternating current electric apparatus having windings subject to transient magnetizing currents.

In the application of circulating current protection to alternating current apparatus having a winding subject to transient magnetizing currents, such, for example, as power transformers, current transformers having their primary windings connected in the primary and secondary circuits of a power transformer, have had their secondary windings connected in a closed circuit, the current transformers being so designed, with respect to the ratio of the power transformer, that the secondary currents of the current transformers are normally equal and consequently current circulates in the closed circuit. A relay connected across balance points in the circulating current circuit connecting the secondary windings of the current transformers is thus normally unaffected, and is only energized if the balance of the secondary currents of the circuits is upset, indicating that a fault is present in the power transformer.

Under normal conditions, the difference between the primary and the secondary ampere turns of the power transformer is not zero but is equal to the magnetizing ampere turns of the power transformer. Because of this difference a current normally flows through the relay. The setting of the relay, however, is so chosen that this small current is insufficient to operate the relay. Under certain conditions such as when the power transformer is switched on to a source of power, the magnetizing current may momentarily increase to a considerable value. Consequently there is a possibility that the relay may operate under conditions which do not involve a fault in the power transformer.

Means are already known for preventing the operation of the relay under such circumstances. In one arrangement, disclosed in British Patent 176,134, compensation for the effect produced by the magnetizing current in the secondaries of the current transformers is made by means of a reactor suitably homologous to the power transformer. In another arrangement, the relay is provided with a time delay which is sufficient to prevent its operation in the case where only transient conditions are present. Such an arrangement, however, tends to delay the operation of the relay when a fault is present in the transformer.

An object of our invention is to provide an improved protective arrangement which is not subject to false operation on the occurrence of transient magnetizing currents alone.

Figure 2:
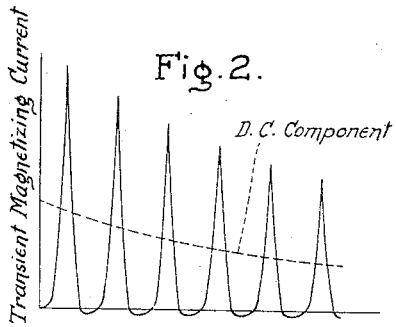

Our invention is based on the fact that the wave form of transient magnetizing currents such, for example, as may be caused by the connection of a power transformer to a source of power, exhibit a large asymmetrical or D. C. component, that is the current wave is displaced with respect to the zero axis, as shown in Fig. 2. In effect, a direct current or low frequency component is superposed on the normal alternating current frequency.

Our invention accordingly consists in preventing or delaying the operation of relay means connected in a circulating current circuit, which is associated with alternating current apparatus having a winding subject to transient magnetizing currents, when an asymmetrical component is present by reason of such currents.

The broad aspects of our invention, wherein operation is controlled by apparatus functioning in accordance with the asymmetrical component of the transient magnetizing current, are disclosed and claimed in the copending application of Jean Gustave Fallou, Serial No. 479,408, filed September 2, 1930, and assigned to the same assignee as this invention.

Our invention will be better understood from the following description when considered in connection with the accompanying drawing and its scope will be pointed out in the appended claims.

Figure 3:
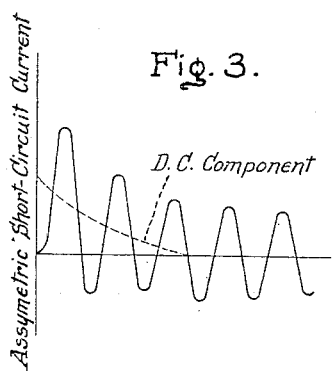

In the accompanying drawing Fig. 1 illustrates diagrammatically an embodiment of our invention as applied to the protection of a power transformer and Figs. 2 and 3 are wave forms explanatory of our invention.

In the embodiment of our invention shown in Fig. 1 alternating current apparatus having a winding subject to transient magnetizing currents, such for example as a power transformer 5, is arranged to have its circuit controlled by suitable circuit interrupting means which are illustrated as latched-closed circuit breakers 6 and 7 provided with trip coils 8.

For protection against faults in the transformer 5, the circuit breakers are arranged to be controlled in accordance with the difference between the current input and the current output of the transformer. For this purpose there are provided current transformers 9 and 10 respectively connected in series relation with the circuits of the windings 51 and 52 of the power transformer 5. The secondary windings of the current transformers 9 and 10 are connected in a series cumulative or circulating current circuit 11 across normally equi-potential points of which there is connected electro-responsive means 12 whose operation is dependent upon the difference between the current input and the current output of the transformer 5.

In accordance with our invention, the electro-responsive means 12 comprises cooperating means such as windings 13 and 14 which are respectively connected to be energized in accordance with the rectified positive and negative loops of the difference between the alternating current input and output of the transformer. The rectifying means 15 and 16 are shown schematically since it is obvious that any suitable rectifying means, examples of which are well known to the art, may be employed. The rectifying means 15 is arranged to pass one loop of the difference current through the winding 13 and to block the other loop while the rectifying means 16 is arranged to pass the second loop through the winding 14 and prevent the first loop from passing through.

The electroresponsive means 12 may be a relay which operates in accordance with a predetermined function of the rectified currents. Thus, for example, the electroresponsive means 12 may be a uni-directional current responsive relay having wattmetric characteristics. Examples of relays suitable for the purpose are well known to the art but there may be mentioned, for example, the dynamometer type of relay.

Referring now to Figs. 2 and 3, it will be apparent that the two rectified currents appearing in the windings 13 and 14 will differ in time relation and accordingly we may provide suitable means, such as a condenser 17, connected across one of the windings 14, to maintain this winding energized simultaneously with the winding 13 so as to insure the desired action.

Referring now to Fig. 2, it will be obvious that the winding energized by the rectified positive loops will receive a much larger current than the winding energized by the rectified negative loops so that the electroresponsive means 12 if operative on the basis of the product of the currents in the two rectified loops will exert very little, if any, effect tending to close its contacts 18 and there will be no false operation of the relay to trip the circuit breakers 6 and 7. On the other hand, in the case of a fault in the transformer, it will be apparent from Fig. 3 that the rectified currents corresponding to each positive and negative loop will be of such magnitudes that their product will be much greater than in the case of the transient magnetizing current condition and consequently the product of the currents will be sufficient to effect operation of the relay and thereby the tripping of the circuit breakers.

What we claim as new and desire to secure by Letters Patent of the United States is:

1. In combination with alternating current apparatus having a winding subject to transient magnetizing currents, means for controlling the circuit of said apparatus including means for deriving from said apparatus an alternating current dependent on the difference between the current input and the current output of said apparatus, means for rectifying the positive and negative loops of said difference current and relay means having two cooperating windings respectively connected to be energized in accordance with the rectified currents.

2. In combination with alternating current apparatus having an inductive winding, means for controlling the circuit of said apparatus including cooperating windings respectively connected to be energized in accordance with the rectified positive and negative loops of the difference between the alternating current input and output of said apparatus.

3. In combination with alternating current apparatus having a winding subject to transient magnetizing currents, means for controlling the circuit of said apparatus including means for deriving from said apparatus an alternating current dependent on the difference between the current input and the current output of said apparatus, means for rectifying the positive and negative loops of said difference current and means connected to be energized by said rectified currents for operation in accordance with a predetermined function thereof.

4. In combination with alternating current apparatus having a winding subject to transient magnetizing currents, circuit interrupting means for controlling the circuit of said apparatus, means for controlling said circuit interrupting means including means for deriving from said apparatus an alternating current dependent on the difference between the current input and the current output of said apparatus, means for rectifying the positive and negative loops of said difference current and uni-directional current responsive means connected to be energized by the rectified currents for controlling said circuit interrupting means in accordance with a predetermined function of the rectified currents.

5. In combination with alternating current apparatus having a winding subject to transient magnetizing currents, means for controlling the circuit of said apparatus including means for deriving from said apparatus an alternating current dependent on the difference between the current input and the current output of said apparatus, means for rectifying the positive and negative loops of said difference current and uni-directional current means connected to be energized by said rectified currents operative in accordance with the product thereof.

In witness whereof, we have hereunto set our hands.

J. G. WELLINGS.
C. G. MAYO.
PAUL MATHEWS.